United States Patent [19]
Matzner

[11] 3,843,708

[45] Oct. 22, 1974

[54] EXTENDED POLYLACTONE DIOL COMPOSITIONS

[75] Inventor: Markus Matzner, Edison, N.J.

[73] Assignee: Union Carbide Corporation, New York, N.Y.

[22] Filed: Mar. 24, 1971

[21] Appl. No.: 127,819

Related U.S. Application Data

[62] Division of Ser. No. 792,125, Jan. 17, 1969, Pat. No. 3,641,200.

[52] U.S. Cl. ............................................... 260/463
[51] Int. Cl. ......................................... C07c 69/00
[58] Field of Search .......................... 260/484, 463

[56] References Cited
UNITED STATES PATENTS
2,917,410  12/1959  Vitalis ........................... 260/484 R Primary Examiner—Lorraine A. Weinberger
Assistant Examiner—Paul J. Killos
Attorney, Agent, or Firm—Eugene C. Trautlein

[57] ABSTRACT

This invention relates to improved block copolycarbonates containing an amorphous, soft, rubbery segment or block composed of lactone units and other crystalline, hard, thermoplastic segment or block composed of dihydric phenol carbonate units.

The present invention also relates to novel liquid compositions formed by extending an appropriate polylactone diol with an extending agent selected from the group consisting of dihydric phenols, aliphatic diols, dicarboxylic acids and hydroxy monocarboxylic acids. The aforementioned extended diols are particularly useful in the production of the block copolycarbonates of this invention.

This invention also contemplates a novel method for reducing the extent of annealing time normally required for the primary crystallization of a block copolycarbonate of this invention comprising including in the block copolycarbonate composition, prior to primary crystallization, a nucleating agent.

2 Claims, No Drawings

EXTENDED POLYLACTONE DIOL COMPOSITIONS

This application is a divisional of Ser. No. 792,125, filed 01/17/1969, now U.S. Pat. No. 3,641,200.

Block copolycarbonates of the general class to which the present invention is concerned are well known in the art. There have been a number of patents which have issued in the past few years on block copolycarbonates such, for example, as U.S. Goldberg Pat. No. 3,161,615 and U.K. Pat. No. 965,085. Among the many literature references relating to the general subject are "Elastomeric Polycarbonate Block Copolymers" by E. P. Goldberg, J. Polymer Sci, C4, 707 (1963); "Block Copolymers Based on 2,2-(4-hydroxy phenyl) — propane Polycarbonate," part I and part II, appearing respectively in J. Polymer, Sci, 55, 343 (1961) and J. Polymer Sci, A3 2189 (1965).

An object of this invention is to provide an improved block copolycarbonate which has a highly desirable balance of properties, in particular good thermal stability at elevated temperatures.

This invention relates to novel copolycarbonates which are block copolymers. Block copolymers are composed of at least two segments or blocks, at least one segment or block being of one type of unit or group (e.g., lactone units as in the block copolymers of this invention) and at least one other segment or block composed of a different type of units or groups (e.g., dihydric phenol carbonate groups). Block copolymers can have linear, cyclic, branched or cross linked structures.

The block copolycarbonates of this invention comprise (1) divalent carbonate groups (i.e.,

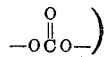

(2) divalent polylactone moieties containing a plurality of lactone groups represented by the formula:

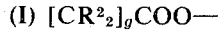

wherein $R^2$ is selected from the class consisting of hydrogen and monovalent hydrocarbon groups free of unsaturation and having 1 to 18 carbon and $g$ is an integer of 5 or 6; and, (3) divalent aromatic carbocyclic residues derived from a dihydric phenol by removal of the hydroxyl groups, each of at least some of said carbonate groups being attached to two aromatic carbocyclic residues, and each of at least some of the carbonate groups linking one of said aromatic carbocyclic residues to one of said divalent polylactone moieties, the polylactone moieties being in an amount from about 50 to 80 percent by weight of the total composition.

Preferred block copolymers of this invention are represented by the formula:

(II)

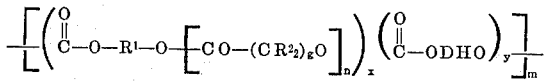

wherein $R^1$ is a divalent organic radical, preferably a divalent hydrocarbon (e.g., aliphatic) radical or two or more such divalent hydrocarbon radicals joined by ether oxygen; and
wherein $R^2$ is selected from the class consisting of hydrogen and monovalent hydrocarbon groups free of aliphatic unsaturation and having 1 to 18 carbon atoms and $g$ is an integer of 5 or 6; and, wherein DH is a divalent aromatic carbocyclic group derived from a dihydric phenol by removal of the hydroxy groups; and, wherein $x$ and $y$ have values so that the relative weight of the polylactone blocks are 50 to 80 percent by weight and the dihydric phenol polycarbonate blocks are 50 to 20 percent by weight of the total composition; and, wherein $n$ is an integer so that the molecular weight of the polylactone segment is in the range of 500 to 3,000; and, wherein $m$ has a value so that the block copolymer has a reduced viscosity of at least 0.70 in chloroform (0.2 gram block copolymer/100 ml. solution at 25°C; and, wherein the block copolycarbonate has a glass transition temperature below 0°C (preferably below −10°C) and a tensile modulus of 100 p.s.i. at a temperature of 150°C (preferably 200° C), said tensile modulus being referred to hereinafter as "$T_2$."

The block copolymers of this invention are useful in the same manner as the heretofore known block copolycarbonates (e.g., fibers, conveyor belts, shoe soles, etc.). Other uses are impact modifiers, tackifiers, plasticizers, adhesives and binders.

The novel copolycarbonates of this invention may be prepared by any of the known methods for producing block copolycarbonates such, for example, as the ester exchange method, the interfacial method or the solution method disclosed in the article "Elastomeric Polycarbonate Block Copolymers" by Eugene P. Goldberg, Journal of Polymer Science, C4, 707 (1963).

The preferred method for the production of the block copolycarbonates of this invention is the known solution technique disclosed in the above referred to Goldberg article as well as U.S. Goldberg Pat. No. 3,161,615. In this method, the appropriate diol reactants are incorporated in a suitable organic base such as a tertiary amine (e.g., pyridine, substituted pyridines such, for example, as 3-methyl-pyridine, 4-methyl-pyridine, 3-chloro-pyridine and 4-chloro-pyridine; dimethylaniline, quinoline, substituted quinolines such, for example, as 3-methyl quinoline, 4-methyl quinoline, 3-chloro quinoline and 4-chloro quinoline; etc.) and reaction effected with phosgene or a dibasic acid halide.

As pointed out in the U.S. Goldberg patent, the base can be used undiluted or diluted with inert solvents, for example hydrocarbons such as benzene, toluene, xylene, etc., and halocarbons such as chloroform, chlorobenzene, methylene dichloride, etc. The use of tertiary amine as bases is advantageous in that they serve to catalyze the reaction, are good solvents, and act as acceptors for halogen acid given off during the rection. Although the phosgene reaction can be carried out over a wide range of temperatures, for example from below −10°C to over 100°C, the reaction proceed satisfactorily at 0° to 50°C.

In employing the preferred solution technique, the block copolycarbonates of this invention may be prepared by a direct one step reaction of phosgene or any other dibasic acid halide with a dihydric phenol and an appropriate hydroxyl terminated polyacetone (molecular weight 500–3,000) in an appropriate solvent (e.g., methylene chloride/pyridine solvent) or by a two-step technique wherein a bischloroformate of a dihydric phenol is first formed and then reacted with more dihydric phenol and the hydorxyl terminated polylactone, or a two-step process wherein both the bischloroformate of the dihydric phenol and bischloroformate of the hydroxyl terminated polylactone are first formed and then reacted with more dihydric phenol.

In all of the above-mentioned processes, the total number of moles of acid halide end groups must be approximately equal to the total number of hydroxy end groups. By employing the two-step techniques a block copolycarbonate of a more regular structure is formed.

In forming the block copolycarbonates of this invention, the carbonate precusor (e.g., phosgene) is used in an amount equal to at least the molar concentration of the dihydric phenol and hydroxyl terminated polylactone.

In forming the block copolycarbonates of this invention, the dihydric phenols suitably employed include the entire class of such compounds heretofore utilized in the preparation of polycarbonate resins by prior known conventional methods. In general, such dihydric phenols are usually defined as being a mononulcear or polynuclear phenol in which the two hydroxyl groups are directly attached to different nuclear carbon atoms of the same or different aromatic nucleus. The class of suitable dihydric phenols is quite large and includes those compounds described in U.S. Pat. No. 2,950,266 — Goldblum, and U.S. Pat. No. 2,964,797 — Pielstocker et al and my U.S. Pat. No. 3,223,677, which correspond to the general formula (III)

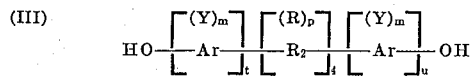

wherein R is hydrogen or a monovalent hydrocarbon radical, for example, alkyl radical (e.g., methyl, ethyl, propyl, isopropyl, butyl, decyl, etc.), aryl radicals (e.g., phenyl, naphthyl, biphenyl, tolyl, xylyl, etc), aralkyl radicals (e.g., cyclopentyl, cyclo-hexyl, etc.) as well as monovalent hydrocarbon radicals containing inert substituents therein, such as halogen (chlorine, bromine, fluorine, etc.). It will be understood that where more than one R is used, they may be the same or different. $R_2$ is selected from the group consisting of an alkylene and alkylidene residue such as methylene, ethylene, propylene, propylidene, isopropylidene, butylene, butylidene, amylene, isoamylene, isoamylidene, cyclohexylidene, etc. $R_2$ can also be a silane radical or can be a polyoxy such as polyethoxy, polypropoxy, polythioethoxy, polybutoxy, polyphenylethoxy or polyorganosiloxy, for example, polydimethyl ethoxy or polyorganosiloxy, polymethylphenyl siloxy, etc., or an ether, a sulfur-containing linkage such as sulfied, sulfoxide, sulfone, a carbonyl, a tertiary nitrogen or silicon containing linkage such as silane or siloxy. $R_2$ can also consist of two or more alkylene or alkyidene groups, such as above, separated by the residue of an aromatic nucleus, a tertiary amino radical, an ether radical or by a carbonyl radical, a silane or siloxy radical or by a sulfur-containing radical such as sulfide, sulfoxide, sulfone, etc. Other groupings which can be represented by $R_2$ will occur to those skilled in the art. Ar is the residue of an aromatic nucleus, Y is a substituent selected from the group consisting of (a) inorganic atoms, (b) inorganic radicals, and (c) organic radicals, (a), (b) and (c) being inert to and unaffected by the reactants and by the reaction conditions, $m$ is a whole number including zero to a maximum equivalent to the number of replaceable nuclear hydrogens substituted on the aromatic hydrocarbon residue, $p$ is a whole number including zero to a maximum determined by the number of replaceable hydrogens on $R_2$, $s$ ranges from zero to 1, $t$ and $u$ are whole numbers, preferably 1. When $s$ is zero, however, either $t$ or $u$ may be zero and not both.

In the dihydric phenol compound, the substituent Y may be the same or different, as may be the R. Among the substituents represented by Y are halogen (e.g., chlorine, bromine, fluorine, etc.) or oxy radicals of the formula OZ, where Z is a monovalent hydrocarbon radical similar to R, or monovalent hydrocarbon radicals of the type represented by R. Other inert substituents such as a nitro group can be represented by Y. Where $s$ is zero in Formula I, the aromatic nuclei are directly joined with no intervening alkylene or alkylidene or other bridge. The positions of the hydroxyl groups and Y on the aromatic nulcear residues Ar can be varied in the ortho, meta, or para positions and the groupings can be in a vicinal, asymmetrical or symmetrical relationship, where two or more of the nuclearly bonded hydrogens of the aromatic hydrocarbon residue are substituted with y and the hydroxyl group. Examples of dihydric phenol compounds that may be employed in this invention include 2,2-bis(4-hydroxyphenyl)-propane (Bisphenol-A);
2,2-bis(3,5-dichloro-4-hydroxyphenyl) propane;
2,4'-dihydroxydiphenyl-methane;
bis-(2-hydroxyphenyl)-methane;
bis-(4-hydroxyphenyl)-methane;
bis-(4-hydroxy-5-nitrophenyl)-methane;
bis-(4-hydroxy-2,6-dimethyl-3-methoxyphenyl)-methane;
1,1-bis-(4-hydroxyphenyl)-ethane;
1,2-bis-(4-hydroxyphenyl)-ethane;
1,1-bis-(4-hydroxy-2-chlorophenyl)-ethane;
1,1-bis-(2,5-dimethyl-4-hydroxyphenyl)-ethane;
1,3-bis-(3-methyl-4-hydroxyphenyl)-propane;
2,2-bis-(3-phenyl-4-hydroxyphenyl)-propane;
2,2-bis-(3-isopropyl-4-hydroxyphenyl)-propane;
2,2-bis-(4-hydroxynaphthyl)-propane;
2,2-bis-(4-hydroxyphenyl)-pentane;
3,3-bis-(4-hydroxyphenyl)-pentane;
2,2-bis-(4-hydroxyphenyl)-heptane;
bis-(4-hydroxyphenyl)-phenyl methane;
bis-(4-hydroxyphenyl)-cyclohexyl methane;
1,2-bis-(4-hydroxyphenyl)-1,2-bis-(phenyl) ethane;
2,2-bis-(4-hydroxyphenyl)-1,3-bis-(phenyl)-propane;
2,2-bis-(4-hydroxyphenyl)-1-phenyl propane;
and the like. Also included are dihydroxybenzenes typified by hydroquinone and resorcinol, dihydroxydiphenyls such as 4,4'-dihydroxydiphenyl; 2,2'-dihydroxydiphenyl; 2,4'-dihdroxydiphenyl; dihydroxynaphthalenes such as 2,6-dihydroxynaphthalene, etc. Dihydroxy aryl sulfones such as bis-(p-hydroxyphenyl)-sulfone; 2,4'-dihydroxydiphenyl sulfone; 5'chloro-2,4'-dihydroxydiphenyl sulfone; 5'-chloro-2',4-dihydroxydiphenyl sulfone; 5'-chloro-2'4-dihydroxydiphenyl sulfone; 3'-chloro-4,4'-dihydroxydiphenyl sulfone, bis (4-hydroxy phenyl) biphenyl disulfone, etc. The preparation of these and other useful sulfones is described in U.S. Pat. No. 2,288,282 — Huissman. Polysulfones as well as substituted sulfones using halogen, nitrogen alkyl radicals, etc. are also useful. Dihydroxy aromatic ethers such as p,p'-dihydroxydiphenyl ether;
the 4,3'-, 4,2'-, 3,3'-, 2,2'-, 2,3'-etc., dihydroxydiphenyl ethers;
4,4'-dihydroxy-2,6-dimethyldiphenyl ether;
4,4'-dihydroxy-2,5-dimethyldiphenyl ether;
4,4'-dihydroxy-3,3'-di-isobutyldiphenyl ether;
4,4'-dihydroxy-3,3'-diisopropyldiphenyl ether;
4,4'-dihydroxy-3,2'-dinitrodiphenyl ether;
4,4'-dihydroxy-3,3'-difluorodiphenyl ether;
4,4'-dihydroxy-2,3'-dibromodiphenyl ether;
4,4'-dihydroxydinaphthyl ether;
4,4'-dihydroxy-3,3'-dichlorodinaphthyl ether;
2,4-dihydroxytetraphenyl ether;
2,4-dihydroxytetraphenyl ether;
4,4'-dihydroxypentaphenyl ether;
4,4'-dihydroxy12,6-dimethoxydiphenyl ether;
4,4'-dihydroxy-2,5-diethoxydiphenyl ether, etc.

Mixtures of the dihydric phenols can also be employed and where dihydric phenol is mentioned herein, mixtures of such materials are considered to be included. Preferably the dihydric phenol is a gem-bis-(hydroxyphenyl) alkane in which the central alkylidene radical contains from 1 to 6 carbon atoms.

As indicated hereinbefore, the lactone units in the polylactone blocks of the block copolymers of this invention have the following structure:

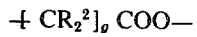

wherein $R^2$ is hydrogen or monovalent hydrocarbon as defined above and $g$ in an integer of 5 to 6. Illustrative of such lactone units are epsilon-caprolactone units, e.g., $-[CH_2]_5COO-$, monoalkyl epsilon-caprolactone units, e.g., $-C(CH_3)$ H $(CH_2)_4COO-$, $-CH_2C(C_{12}H_{25})$ H $(CH_2)_3COO-$, and the like, dialkyl epsilon-caprolactones, e.g., $-C(C_2H_5)$ HC$(C_2H_5)$ H $(CH_2)_3-COO-$, $-CH_2C(C_3H_7)HCH_2C(CH_3)HCH_2COO-$, and the like, cycloalkyl, aryl alkaryl and aralkyl epsilon-caprolactones, e.g., $-(CH_2)_2-C(C_6H_{11})H(CH_2)_2-COO-$, $-(CH_2)_3C(C_6H_5)HCH_2COO-$, $-C(CH_2C_6H_5)H(CH_2)_4-COO-$, and the like wherein $C_6H_{11}$ is cyclohexyl, $C_6H_5$ is phenyl and $-CH_2C_6H_5$ is benzyl.

The polylactone segments are provided, for example, by using as a reactant a polylactone diol represented by the formula:

(IV) HO-R$^1$—O [ CO—(CR$_2^2$)$_g$O]$_n$H wherein $R^1$, $R^2$, $g$ and $n$ are the same as in formula II.

The following examples illustrate the preparation of block-copolycarbonates of this invention by direct phosgenation of a mixture of the dihydric phenol and the polylactone diol in methylene chloride/pyridine solvent (60/40 wt. ratio). The same general procedure described with respect to Example 1 was used in Example 2 to 5.

In the Tables which appear hereinlater a number of abbreviations are used. The abbreviations are now given followed by the full names.

| | |
|---|---|
| Coag. Polym. | Coagulated Polymer |
| R V | Reduced Viscosity |
| React. Mixt. | Reaction Mixture |
| Mod. | Modulus |
| Str. | Strength |
| Elong. | Elongation |
| P. Imp. | Pendulum Impact |
| ~ | about |
| m Mole | millimole |
| Amt. | Amount |
| Mol. Wt. | Molecular Weight |
| Cryst. | Crystallization |
| T.M. | Tensile Modulus |
| 100% M | 100% Modulus |
| 300% M | 300% Modulus |
| T.S. | Tensile Strength |
| E. | Elongation |

Examples 1 thru 5 which follow illustrate the preparation of block copolymers from a mixture of a polycaprolactone diol of a molecular weight of 840 (Polylactone I) and bisphenol A via the direct phosgenation method.

Reduced viscosity (RV) is determined by dissolving a 0.2 gram sample of polymer in chloroform in a 100 ml volumetric flask so that the resultant solution measures exactly 100 ml at 25°C in a constant temperature bath. The viscosity of 3 ml of the solution which has been filtered through a sintered glass funnel is determined by a viscometer at 25°C. Reduced viscosity values are obtained from the equation:

wherein:
$t_o$ is the efflux time of the pure solvent
$t_s$ is the efflux time of the polymer solution
$c$ is the concentration of the polymer solution expressed in terms of grams of polymer per 100 ml of solution Glass transition temperature (Tg), commonly referred to as the second order phase transition temperature, refers to the inflection temperatures found by plotting the resilience (recovery from one per cent elongation) of a film ranging in thickness from 3 to 15 mils against the temperature. See Brown, *Textile Research Journal*, 25, 891 (1955).

EXAMPLE 1

Preparation of a block-copolycarbonate from Polylactone I and bisphenol-A
Reagents:
Polylactone I (See Table I)
Bisphenol-A — high purity, m.p. 155°–156°C.
Methylene Chloride and Pyridine, dried over 4A molecular sieves.
Phosgene-Matheson — 99° purity.
Apparatus
A three-neck 500 ml. flask equipped with mechanical stirrer, reflux condenser, thermometer, and dry-argon and phosgene inlet-tubes. The argon is circulated over the reaction mixture; phosgene is bubbled into the mixture. The addition of phosgene was made from a tank placed on a solution balance.
Experiment
Polylactone I, 12.83 gm. (0.01527 mole; 45 wt. percent, 18.2 percent $m$. based on the total diol charge), bisphenol-A, 15.67 gms. (0.06864 m; 55 wt. percent, 81.8 mole percent based on the total diol charge), pyridine, 100 ml., and methylene chloride, 150 ml., were charged into the flask. Stirring and circulation of dry argon were started. The contents in the flask were cooled to ~20°C. Addition of phosgene was started.

Approximately 8 gms. (96 percent of the required amount) of phosgene were added to the mixture within 11 minutes. A cooling ice-water bath was maintained around the flask during that period of time. The temperature of the mixture rose to 30°C. A white precipitate of pyridine hydrochloride formed. The cooling bath was removed and the rate of the addition of phosgene substantially decreased. After 14 additional minutes, the reation mixture was very viscous and practically colorless. Its temperature was 30°C. The phosgenation was stopped. Reaction cycle: 25 minutes. The polymer solution was coagulated in 2 liters of methanol. The white fluff was washed twice with methanol and twice with distilled water. Each wash: 2 liters of solvent; 5 minutes of vigorous stirring in the Waring Blendor. It was then dried at about 60°C (under vacuum) till constant weight. Yield: 93.6 percent RV ($CHCl_3$, 25°C.; 0.2 g. /100 ml) = 1.35.

EXAMPLES 2 – 5

Following the same general procedure as used in Example 1, four other block copolycarbonates (Example 2 – 5) were prepared varying the amounts of reactants. Examples 1 – 5 are summarized in Table I.

Examples 6 thru 9 (Table II) relate to block-copolycarbonates prepared by direct phosgenation of a mixture of polycaprolactone diol of a molecular weight of 1993 (Polylactone II) and bisphenol A.

Examples 10 thru 14 (Table III) illustrate block copolycarbonates prepared by direct phosgenation of a mixture of various polycaprolactone diols and dihydric phenols other than bisphenol A.

Tables A and B summarize various physical properties of a number of the block copolycarbonates of this invention.

TABLE I

Block-Copolycarbonates from Bisphenol A and Polylactone I[1]

| Example No. | Polylactone I Wt.[2] % | Polylactone I Mole[2] % | Bisphenol A Wt.[2] % | Bisphenol A Mole[2] % | Polymerization Time (hrs.) | Polymerization Temp. (°C.) | Color Reaction Mixture | Color Coag. Polym. | $RV_3$ | Polymer Yield % |
|---|---|---|---|---|---|---|---|---|---|---|
| 2 | 65 | 33.51 | 35 | 66.49 | 1.08 | 20–31 | Pract. colorless | White | 1.35 | 90.7 |
| 3 | 60 | 28.93 | 40 | 70.07 | 0.5 | 21–35 | Colorless | White | 1.94 | 93.3 |
| 4 | 55 | 24.92 | 45 | 75.08 | 0.7 | 22.5–36 | Light-yellow | White | 2.72 | 91.3 |
| 5 | 50 | 21.37 | 50 | 78.63 | 0.48 | 24–38 | Colorless | White | 1.49 | 93.9 |
| 1 | 45 | 18.2 | 55 | 81.8 | 0.42 | 22–30 | Colorless | White | 1.35 | 93.6 |

1. Polylactone I is a polycaprolactone of mol. wt. 840. It is obtained by the base-catalyzed polymerization of ε-caprolactone with diethylene glycol as initiator.
2. The percentages are based upon the total diol charged only.
3. All RV's in $CHCl_3$ at 25° C. (0.2g./100 ml.).

TABLE II

Block-Copolycarbonates from Bisphenol-A and Polylactone II[1]

| Example No. | Polylactone II % Wt.[2] | Polylactone II % Mole[2] | Bisphenol-A % Wt.[2] | Bisphenol-A % Mole[2] | Reaction Time(hr)[3] | Color Reaction Mixture | Color Coagulated Polym. | $RV^4$ | Polymer Yield (%) |
|---|---|---|---|---|---|---|---|---|---|
| 6 | 60 | 14.66 | 40 | 85.34 | 2 | Pract. colorless | White | 2.18 | 94.8 |
| 7 | 55 | 12.26 | 45 | 87.74 | 0.75 | Light-yellow | White | 1.85 | 91.7 |
| 8 | 50 | 10.26 | 50 | 89.74 | 0.33 | Colorless | White | 1.86 | 94 |
| 9 | 45 | 8.56 | 55 | 91.44 | 0.58 | Pract. colorless | White | 1.60 | 93.6 |

1. Polylactone II is a polycaprolactone, molecular weight 1,993, obtained by the base-catalyzed polymerization of ε-caprolactone with diethylene glycol as initiator.
2. The percentages are based on the total diol charge only.
3. The temperature in all runs was kept within 18–33°C.
4. All RV's in $CHCl_3$, at 25°C. (0.2 g./100 ml.).

TABLE III

Block-Copolycarbonates From DiHydric Phenols Other Than Bisphenol-A

| Example No. | Amorphous Block % Wt.[1] | Amorphous Block % Mole[1] | Bisphenol % Wt.[1] | Bisphenol % Mole[1] | Reaction Time (hr.)[2] | Color React. Mixt. | Color Coag. Polym. | Polymer $RV^3$ | Polymer Yield(%) | Remarks |
|---|---|---|---|---|---|---|---|---|---|---|
| 10 | Polylactone I 65 | 19.57 | Hydroquinone 35 | 80.43 | 0.84 | Yellow | Light yellow | 0.20 | 91.2 | Polymers crystalized from radiation |
| 11 | Polylactone I 70 | 23.42 | Hydroquinone 30 | 76.58 | 0.84 | Yellow | Light yellow | 0.46 | 92.9 | do. |
| 12 | Polylactone I 75 | 28.21 | Hydroquinone 25 | 71.79 | 0.5 | Light brown | Light yellow | 0.49 | 85.9 | do. |
| 13 | Polylactone II 60 | 13.88 | 4,4' dihydroxy benzophenone 40 | 86.12 | 0.53 | Brown | Brown | 0.33 | 63.7 | do. |

TABLE III—Continued

Block-Copolycarbonates From DiHydric Phenols Other Than Bisphenol-A

| Example No. | Amorphous Block | | Bisphenol | | Reaction Time (hr.)[2] | Color | | Polymer RV[3] | Remarks Yield(%) |
|---|---|---|---|---|---|---|---|---|---|
| | % Wt.[1] | % Mole[1] | % Wt.[1] | % Mole[1] | | React. Mixt. | Coag. Polym. | | |
| 14 | Polylactone II | | Dihydroxybenzophenone[4] | | 0.84 | Dark yellow | Tan | 0.80[5] | 94.7 Color is probably due to impurities in starting diphenol (initial solution of reactants was also dark yellow) |
| | 60 | 13.88 | 40 | 86.12 | | | | | |

[1] The percentages are based on the total diol charge only.
[2] The temperature of the reactions was kept within the interval of ~10–35°C.
[3] All RV's in m-cresol, at 25°C. (0.2 g./100 ml.).
[4] Mixture of isomers.

TABLE A
Properties of Block-copolycarbonates from Bisphenol-A and Polylactone I

| Ex. No. | Polylactone (percent) | | Bisphenol (percent) | | Mold temp. (°C.) | RV | Annealed (?) | Tensile | | Elong. (percent) | P. imp. (ft. lbs. in.)[3] | (°C.) | | | | Crystallinity |
|---|---|---|---|---|---|---|---|---|---|---|---|---|---|---|---|---|
| | Wt. | Mole | Wt. | Mole | | | | Mod. (p.s.i.) | Str. (p.s.i.) | | | Tg[b] | T₄[c] | T₃[d] | T₂[e] | |
| 1 | 45 | 18.2 | 55 | 81.8 | 150 | 0.85 | No | 3,800 | 5,600–8,000 | 360 | | ~20 | | | 65–70 | Low or none. |
| | | | | | | | Yes[a] | 3,800 | 8,000 | 360 | | ~20 | <25 | 130 | 160–170 | Medium. |
| 2 | 65 | 33.51 | 35 | 66.49 | 120 | 1.29 | No | 400 | 30 | 700 | | <10 | | | 40 | None. |
| 3 | 60 | 28.93 | 40 | 70.07 | 130–135 | 1.56 | No | 500 | 100–600 | 1,000 | >480 | <10 | | | 65 | None. |
| | | | | | | | Yes[a] | 500 | 100–600 | 1,000–1,500 | >480 | <10 | <25 | <25 | 65 | Low or none. |
| 4 | 44 | 24.92 | 45 | 75.08 | 150 | 1.49 | No | 500 | 380–1,500 | 500 | | <25 | | | 65 | None. |
| | | | | | | | Yes[a] | 600 | 1,250 | 500 | 600 | <25 | <25 | <25 | 65 | Low or none. |

[a] Annealed for 16 hrs. at 100° C.
[b] Tg—glass transition temperature.
[c] T₂—temperature at which tensile modulus is 100 p.s.i.
[d] T₃—temperature at which tensile modulus is 1,000.
[e] T₄—temperature at which tensile modulus is 10,000.

TABLE B
Properties of Block-Copolycarbonates from Bisphenol-A and Polylactone II

| Example number | Polylactone II (percent) | | Bisphenol-A (percent) | | Mold temp. (°C.) | RV | Annealed | Tensile | | Elong. (percent) | P. imp. (ft. lbs./in.[3]) | (°C.) | | | | Crystallinity |
|---|---|---|---|---|---|---|---|---|---|---|---|---|---|---|---|---|
| | Wt. | Mole | Wt. | Mole | | | | Mod. (p.s.i.) | Str. (p.s.i.) | | | Tg* | T₄* | T₃* | T₂* | |
| 6 | 60 | 14.66 | 40 | 85.34 | 170 | 1.56 | Yes[1] | | | | | | | | 60 | Low or none. |
| | | | | | | | Yes[2] | 1,600 | 1,700 | 575 | | <25 | <25 | 75 | 160 | Medium-low. |
| 7 | 55 | 12.26 | 45 | 87.74 | 150 | 1.58 | No | 640 | 240 | 1,000 | >600 | | | | 75 | None. |
| | | | | | | | Yes[1] | 1,600 | 2,600 | 680 | >600 | <25 | <25 | 100 | 160 | Medium-low. |
| 8 | 50 | 10.26 | 50 | 89.74 | 150 | 1.62 | No | 800 | 500 | 320 | 540 | <25 | | | 85 | None. |
| | | | | | | | Yes[3] | 2,800 | 6,100 | 550 | 540 | <25 | <25 | 135 | 175 | Medium. |
| 9 | 45 | 8.56 | 55 | 91.44 | 160 | 1.1 | No | 3,100 | 7,200 | 390 | >600 | <25 | | | 100 | Low. |
| | | | | | | | Yes[4] | 3,100 | 7,200 | 390 | >600 | <25 | <25 | 165 | 190 | Medium. |

[1] Annealed for 16 hrs. at 100° C.
[2] Annealed for 88 hrs. at 128° C.
[3] Annealed for 3 days at 100° C.
[4] Annealed for 5 hrs. at 115° C.
*See Table A.

From the results reported in Tables A and B, it is seen that block copolycarbonates having a hard bisphenol A - polycarbonate block require an annealing treatment in order to obtain the desired high temperature properties. The necessity of annealing of such block copolymers stems from the fact that the bisphenol A polycarbonate block is amorphous as made and crystallizes slowly. Crystallinity of this block, referred to as primary crystallinity, is required for the development of satisfactory high-temperature properties of the elastomer. Annealing promotes the desired primary crystallinity. Hence, such block copolymers may be effectively spun into fibers or calendered into films since such procedures involve dynamic crystallization of the hard blocks, i.e., crystallization on forming the object. The end effect is equivalent to an annealing treatment.

It has been found that the annealing time that is required with the bisphenol A polycarbonate polylactone block copolymers of this invention may be vastly reduced if the polylactone diol component, prior to reaction with the dihydric phenol to form the block copolymer in the manner described before, is first extended by reaction with a carbonate precursor (e.g., phosgene) and an appropriate amount of an extender. By extending the polylactone diol in the aforementioned manner, a longer, soft polylactone block is obtained in the final block copolymer which in turn permits a longer hard bisphenol polycarbonate A hard block since, for a given weight ratio of bisphenol A hard block/polylactone soft block, the longer the soft block used, the longer should be the hard block in the final elastomer. By increasing the length of the hard block, its rate of crystallization is increased and the required annealing time is decreased.

It should be understood that increasing the length of the soft block by using high molecular weight polylactone diol rather than extending the diol is not desirable since the crystallization tendency of the polylactone diol increases with the increase in its average chain length. So does its melting point. When undesirable crystallization (secondary crystallization) occurs to a significant extent in the soft block, products with undesirably high tensile moduli are obtained. They are no longer elastomeric.

On the other hand, block copolymers based on extended polylactone diols (as the soft blocks) of very high molecular weight (e.g., 40,000) do not display the undesirable secondary crystallization which is due to polylactone diol crystallinity. This is so because extended diols even at high molecular weight are liquids at 25° C.

In producing an extended polylactone diol in accordance with the present invention, the molar concentrations of the reactants are such that the resulting extended polylactone diol has a molecular weight in the range of 2,000 to 30,000, preferably 14,000 to 20,000, and the final block copolycarbonate produced from such extended diols has a reduced viscosity of at least about 0.7, e.g., at least about 0.7 and upwards to about 5, and higher, preferably from about 0.7 to about 2.3 or 3 and most preferably from about 1.2 to 1.6, in chloroform (0.2 gram block copolymer/100 ml. solution at 25°C.).

The extending agents used in accordance with the present invention are selected from the group consisting of dihydric phenols, aliphatic diols and dibasic organic acids and mixtures of the foregoing. Hence, the extended diols contain one or more of the following: dihydric phenol moieties, aliphatic diol moieties, the aforementioned moieties being divalent radicals obtained by removal of the hydrogen of the hydroxyl groups from the extending agent. The link between the divalent radical extender and the divalent polylactone residue is either a carbonate group or an ester group.

The extending agents may be saturated aliphatic, saturated cycloaliphatic or aromatic. The aliphatic and cycloaliphatic extenders may also contain olefinic unsaturation. Such unsaturation is for the following reasons:
1. The extended diols can be vulcanized with sulfur to give cross-linked elastomers; and, 2. The extended diols can be used as a base resin in millable gum compositions; and,
3. The block copolycarbonates based on these extended diols can be cross-linked to give products having desirable solvent resistance.

Generally, the extending agent has a molecular weight in the range of 60 to 2,000.

The dihydric phenol suitably employed as an extender includes any of the diphenol heretofore mentioned as reactants in the production of block copolycarbonates of this invention.

The aliphatic diols that may be used as extenders include cycloaliphatic, straight and branched chain diols free of substituent groups reactive toward the other reactants of the reaction system. In general, these diols conform to the formula (V) HO—Y—OH 

in which Y can be an alkylene group such as ethylene, propylene, butylene, amylene, isoamylene, neopentylene and the like; an alkenylene group (—CH$_2$—CH=CH—CH$_2$—), or two or more alkylene or alkylidene groups connected by a nonalkylene or nonalkylidene group such as an ether linkage, alkylene groups having pendant double bonds such as monoallyl ether of trimethyol propane;

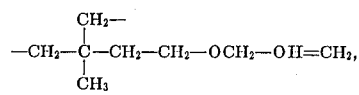

alkylene groups containing aromatic residues, a carbonyl linkage, a sulfur containing linkage such as sulfide, sulfoxide or sulfone, cycloaliphatic residue such as cyclopentyl, cyclohexyl, or a silicon-containing linkage such as silane or siloxy; and a cycloaliphatic group such as cyclopentylene and cyclohexylene. Substituent groups on the Y group can be halogen, nitro, cyano or aryl, but reactive groups such as hydroxyl (other than the two such groups necessarily present) amine, and carboxyl are to be avoided if cross-linking of the polymer is to be avoided.

The dibasic organic acids that may be used as extenders conform to the general formula:

(VI) 

is employed as an additional reactant. In formula VI, D represents either a hydroxyl or a carboxyl group, and G is an alkylene or alkylidene or group such as ethylene, propylene, propylidene, isopropylidene, butylidene, butylene, isobutylidene, amylene, isoamylene amylidene, isoamylidene, neopentylene; a cycloaliphatic group such as cyclopentylene, or cyclohexylene; divalent hydrocarbon groups free of acetylenic unsaturation, an aromatic radical such as phenylene, naphthylene, biphenylene, substituted phenylene, etc.; two or more aromatic groups connected through nonaromatic linkages such as those defined by R$_2$ in formula III; an aralkyl radical such as tolylene, xylylene, etc. G should be free of amine, hydroxyl and carboxyl groups, i.e., the acid of formula VI should be a difunctional compound in the present reaction system. As used hereinafter the structure

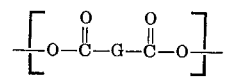

is termed the residue of a dicarboxylic acid, and the structure

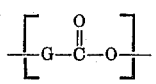

is termed the residue of a monohydroxymonocarboxylic acid.

Included within the scope of this invention are the saturated, aliphatic dibasic acid extenders derived from straight chain paraffin hydrocarbons, such as malonic, dimethyl malonic, succinic, glutaric, adipic, pimelic, suberic, azelaic and sebacic acid. Also included are the halogen-substituted aliphatic dibasic acids. Aliphatic carboxylic acids containing hetero atoms in their aliphatic chain, such as thio-diglycollic or diglycollic acid can also be used. Also useful are olefinically unsaturated acids as, for example, maleic or fumaric.

Examples of suitable aromatic and aliphatic-aromatic dicarboxylic acids which may be used as extenders are phthalic, isophthalic, terephathalic, homophthalic, o-, m-, and p-phenylenediacetic acid; the polynuclear aromatic acids such as diphenic acid, and 1,4naphthalic acid, isopropylidene bis-phenoxyacetic acid.

Examples of hydroxy acid extenders are the aliphatic hydroxy acids such as hydroxybutyric acid, glycollic acid and lactic acid. Examples of aromatic and aliphatic-aromatic hydroxy acids are mandelic acid, p-, m- and o-hydroxy benzoic acid. The hydroxy-substituted long-chain fatty acids, such as 12-hydroxystearic acid may also be used. Cycloaliphatic acids including tetrahydrophthalic, tetrahydroterephthalic, tetrahydroisophthalic, 3,6-endomethylenetetrahydrophthalic acid, hexachloro-3,6-endomethylenetetrahydrophthalic acid or camphoric acid may also be used.

The extended polylactone diols produced in accordance with this invention are difunctional hydroxy terminated stable materials. While these low melting or liquid polymers are particularly useful in forming novel block copolycarbonates, they are useful in several other areas including as the polyol reactant used in producing polyurethane elastomers, spandex fibers, polyurethane sealants and flexible polyurethane foams as well as placticizers and tackifiers for various resins (e.g., polyvinyl chloride and its copolymers).

In producing the extended polylactone diols of the present invention the same solution technique using direct phosgenation for producing the block copolycarbonates of this invention may be employed.

The reaction is generally carried out at a temperature in the range of 0°– 30°C. Higher temperatures are preferably avoided because of undesirable secondary reactions that may occur at temperatures above 30°C.

In order to achieve the production of high molecular weight extended diols, it is necessary for the number of acid halide groups to be approximately equal to the number of hydroxyl groups. Accordingly, with gaseous reactants such as phosgene which are difficult to control, in order to avoid an excess amount in the reaction, most of the gaseous reactant (but less than the stoichometric amount) is passed rapidly in the reaction mixture with the remaining amount introduced slowly to bring the total amount in the reaction mixture to stoichometric proportions.

By the above precautionary steps in introducing phosgene, an undesirable excess of phosgene is avoided. As indicated earlier, generally an excess of any of the reactants reduces the molecular weight of the resulting product.

It has been found that in the production of extended diols by the solution technique using a tertiary base, the higher the amount of tertiary base, the more efficient is the phosgene utilization.

The ratio of polylactone diol to extender may vary. When the extending agent is an aliphatic or cycloaliphatic compound the polylactone diol is in an amount from 0.1 to 10 moles per mole of extender. When the extender is an aromatic compound, the polylactone diol is in an amount from 1 to 10 moles per mole of extender.

Example 15 – 28 which follow relate to the preparation of extended polylactone diols in accordance with the present invention. A typical procedure for producing an extended polylactone diol is shown in detail in Example 15 and a preparation of a series of Polylactone III/Polyether I derived extended diols (Examples 16 – 22) is summarized in Table IV.

Examples 23 – 25 using neopentyl glycol and bisphenol A as extenders are summarized in Table V.

In Table VI is shown the percent hydroxyl and molecular weights of many of the extended diols summarized in Table IV and V. In Table VII, there is summarized additional examples of extended diols of this invention. Table VIII discloses melting point and glass transition data for three extended diols of the invention.

EXAMPLE 15

Preparation of the Extended Diol From Polylactone III and Polyether I (1:1 Molar Ratio)

Apparatus:

A 12-liter, round-bottomed flask equipped with a mechanical stirrer, reflux condenser, thermometer, and dry-argon and phosgene inlet-tubes. The argon is circulated over the reaction mixture; phosgene is bubbled into the mixture. The addition of phosgene was made from a tank placed on a solution balance.

Reagents:

Polylactone III and Polyether I.

Methylene chloride and pyridine dried over 4A molecular sieves.

Phosgene about 99 percent purity.

Experiment:

Into the flask were charged: 330 gms. (0.6226 moles) of the Polylactone III, 124.52 gms. (0.6226 moles) of Polyether I, 5.6 l. $CH_2Cl_2$, and 625.4 ml. (7.7735 moles; 212.13 mole percent excess over the amount stoichiometrically required) of pyridine. The clear, practically colorless solution was cooled to about 4°C. Addition of phosgene at a rate of about 3 gms. $COCl_2$/2 minutes (12.1 m mole percent min) was started. Approximately 101 gms. of phosgene (about 82 percent mole) were added at this rate (additional time: 72 minutes). During this period of time the temperature rose to 30°C; the mixture was cooled to 11°C, and the slow addition of phosgene (rate: 4 g per 10 min. or 3.2 m mole percent/min.) started. It was continued until a total of 139 gms (12.5 mole percent excess over the amount required) of phosgene was added. A white precipitate of pyridine hydrochloride formed; the temperature of the reaction mixture rose to 26.5°C at the end of the phosgenation. The reaction solution was very light-pink.

The excess of pyridine was neutralized with a solution of 438 ml. conc. hydrochloric acid in 2 liters of distilled water. The pink color disappeared on neutralization and a very light yellow organic layer was obtained.

The two-phase, aqueous acid/methylene chloride solution, system was stirred for 1 hr. and then decanted. The organic layer was given a series of waterwashes until the aqueous layer was neutral at the end of the wash. Total number of washes required: 4; each wash: 2 liters of distilled water; stirring times were 0.5 hr. for the first three, and 1 hr. for the last wash. Emulsions formed on washings and were broken by the addition of variable amounts of methanol.

The organic layer was dried over magnesium sulfate, filtered and evaporated. The yellow, clear, viscous residue was then dried til constant weight at about 60°C under house vacuum. It was considered as being at constant weight when its weight loss over 24 hrs. under the drying conditions mentioned above was lower than 0.05 percent.

The yield of residue was 96.1 percent; RV (CHCl$_3$, 25°C; 0.2 g/100 ml.) — 0.49.

All of the other extended diols of Examples 16 – 44 (Table IV to VIII) were prepared using similar techniques. Molecular weights of the products were determined by vapor phase osmometry and by acetylation of the hydroxyl end-groups.

TABLE IV

EXTENDED DIOLS BASED ON POLYLACTONE III AND POLYETHER I[b,c]

| Example No. | Pyridine Amount (gms) | Excess (%) | COCl$_2$ Slow (m Mole %/min.) | Yield (%) | RV[d] | Extended Diol Color/Appearance[e] |
|---|---|---|---|---|---|---|
| 16 | 758.53 | 285.5 | 1.6 | 92.5 | 0.44 | Golden-yellow, viscous clear liquid. |
| 17 | 758.53 | 285.5 | 1.6 | 95.7 | 0.44 | Same as 1 |
| 18 | 758.53 | 285.5 | 1.6 | 93.9 | 0.44 | Same as 1 |
| 19 | 758.53 | 285.5 | 3.2 | 91.9 | 0.82 | Same as 1 |
| 20 | 758.53 | 285.5 | 3.2 | 91.04 | 0.85 | Light-brown, viscous, clear liquid |
| 21 | 614.11 | 212.13 | 3.2 | 91.3 | 0.67 | Same as 5 |
| 22 | 614.11 | 212.13 | 3.2 | 87.3 | 0.63 | Same as 5 |

[a]Polylactone III is a poly(ε-caprolactone) of mol. wt. about 530 produced using diethylene glycol as an initiator.
[b]Polyether I is a polyethylene glycol of mol. wt about 200.
[c]The charge in all of the experiments was: 330 gms. (0.6226 moles) of Polylactone III, 124.52 gms. (0.6226 moles) of Polyether I and 5.6 liters of methylene chloride. The fast addition of phosgene was performed at the rate of 12.1 m mole %/min. and continued until 82% of it were added.
[d]All RV's in CHCl$_3$, at 25°C (0.2 g/100 ml.).
[e]All extended diols displayed a typical ester ordor.

TABLE V

ADDITIONAL EXTENDED DIOLS

| Example No. | Reagents and Amounts | | Solvent, Amt. (liters) | Pyridine Amount (gms) | Excess (%) | COCl2 Fast Rate (m mole %) | Slow Rate /min.) | Yield (%) | Extended Diol RV[a] | Color/Apparatus |
|---|---|---|---|---|---|---|---|---|---|---|
| 23 | Polylactone III[b] 330 gms; 0.6226 m. | Neopentyl Glycol 68.84 gms; 0.6226 m. | CH$_2$Cl$_2$, 5.6 | 1,024.04 | 420.5 | 12.1[c] | 3.2 | 93.2 | 0.48 | Golden-yellow viscous clear liquid |
| 24 | Polylactone III[b] 330 gms; 0.6226 m. | Neopentyl Glycol 21.61 gms; 0.2075 m. | CH$_2$Cl$_2$, 5.6 | 682 | 420 | 12.1[d] | 3.2 | 95.6 | 0.38 | Golden yellow viscous clear liquid |
| 25 | Polylactone III[b] 330 gms; 0.6226 m. | Bisphenol-A 15.77 gms; 0.0691 m. | CH$_2$Cl$_2$, 5.6 | 327.9 | 200 | 12.1[d] | 3.2 | 97.4 | 0.29 | yellow clear liquid quite viscous |

[a]All RV's in CHCl$_3$, at 25°C. (0.2 g/100 ml.)
[b]Poly(ε-caprolactone) of mol. wt. about 530.

TABLE VI

PER CENT HYDROXYL AND MOLECULAR WEIGHTS OF THE EXTENDED DIOLS

| Example No. | Composition[a] | RV[b] | %HO | Mol. Wt.[c] |
|---|---|---|---|---|
| 26 | Polylactone III + Polyether I | 0.25 | 0.594 | 5,700 |
| 27 | (1:1 molar ratio) | 0.30 | 0.52 | 6,500 |
| 17 | do. | 0.44 | 0.246 | 13,800 |
| 18 | do. | 0.44 | 0.24 | 14,150 |
| 28 | do. | 0.52 | 0.196 | 17,350 |
| 22 | do. | 0.63 | 0.076 | 45,000 |
| 25 | Polylactone III + Bisphenol-A (9:1 molar ratio) | 0.29 | 0.59 | 5,750 |
| 24 | Polylactone III + Neopentyl glycol (3:1 molar ratio) | 0.38 | 0.34 | 10,000 |
| 23 | Polylactone III + Neopentyl glycol | 0.48 | 0.23 | 14,800 |

TABLE VI—Continued

PER CENT HYDROXYL AND MOLECULAR WEIGHTS OF THE EXTENDED DIOLS

| Example No. | Composition[a] | RV[b] | %HO | Mol. Wt.[c] |
|---|---|---|---|---|
| 29 | (1:1 molar ratio) Polylactone III + Bisphenol-A (1:1 molar ratio) | 0.36 | 0.96 | 3,600 |

[a]Polylactone III and Polylactone II are poly(ε-caprolactones) of molecular weights~530 and 2,000 respectively. Polyether I is a polyethylene glycol of average molecular weight about 200.
[b]All RV's in $CHCl_3$, at 25°C. (0.2 g/100 ml.).
[c]Calculated by assuming the presence of hydroxyl end-groups only.

TABLE VII

Preparation of Extended Diols[a]

| Example No. | Component A | Component B | Final Rate of Phosgene Addition (m mole %/min.)[d] | Yield | RV[b] | Pyridine Excess |
|---|---|---|---|---|---|---|
| 30 | Polylactone III[c] | Butanediol-1.4[e] | 2.1 | 60 | 0.52 | 400 |
| 31 | do. | Butanediol-1.4[f] | 5.5 | 52 | 0.61 | 200 |
| 32 | do. | Butanediol-1.4[g] | 3.9 | 77 | 0.45 | 250 |
| 33 | do. | Hexanediol-1.6[h] | 3.1 | 93 | 0.72 | 400 |
| 34 | do. | 2,2-diethylpropanediol-1.3[f] | 2.3 | 90 | 0.47 | 160 |
| 35 | do. | 2-ethylhexanediol-1.3[f] | 3.3 | 94 | 0.23 | 400 |
| 36 | do. | — | 2.1 | 77 | 1.07 | 400 |
| 37 | do. | Polyether I[h] | 3.7 | 90 | 0.78 | 400 |
| 38 | do. | do. | 0.7 | 60 | 0.36 | 500 |
| 39 | do. | do. | 0.6 | 85 | 1.03 | 500 |
| 40 | do. | do. | 1.8 | 63 | 0.70 | 500 |
| 41 | do. | do. | 2.5 | 64 | 0.51 | 500 |
| 42 | do. | do. | 5.3 | 87 | 0.97 | 400 |

[a]Prepared by method of Example 15 at reaction temperature of 20°C.
[b]All RV's in $CHCl_3$, (0.2 gms/100ml).
[c]Polylactone III is hydroxyl terminated poly( -caprolactone) mol. wt. about 530.
[d]Describes the rate of addition of the last 40% of phosgene.
[e]A/B = 1:1 (molar)
[f]A/B = 1:3 (molar)
[g]A/B = 2:1 (molar)
[h]Polyether I is a poly(ethylene glycol) of mol. wt. about 210.

TABLE VIII

MELTING POINTS AND GLASS TRANSITION TEMPERATURES OF THE EXTENDED DIOLS

| Example No. | Composition | Extended Diol | | | | |
|---|---|---|---|---|---|---|
| | | Appearance | RV[a] | Mol Wt.[b] | $T_g(°C)$* | $T_2(°C)$* |
| 43 | Polylactone III + Polyether I (1:1 molar ratio) | Liquid | 0.28 | 6,100** | −45 | −20 |
| 44 | do. | do. | 0.51 | 17,300** | −50 | — |
| 19 | do. | do. | 0.86 | 50,000 | −47.5 | — |

[a]All RV's in $CHCl_3$, at 25°C (0.2 g/100 ml.).
[b]Molecular weights by hydroxyl titration.
*See Table A
**approximately

TABLE IX

Carbonate Elastomers[1] based on Preformed Extended Diols.[2]

| Example No. | Extended Diol | | | Polymerization | | Color | | Polymer[4] | |
|---|---|---|---|---|---|---|---|---|---|
| | RV[3] | %HO | Mol. Wt. | Time(hr.) | Temp.(°C) | React. Mixt. | Coag. Polym. | RV[3] | Yield % |
| 45 | 0.25 | 0.59 | 5,700 | 0.3 | 5.20 | Light Yellow | White | 1.22 | 86.4 |
| 46 | 0.30 | 0.52 | 6,500 | 0.5 | 16.23 | do. | do. | 1.45 | 88 |
| 47 | 0.44 | 0.24 | 14,000 | 0.85 | 14–26 | Pract. Colorless | do. | 1.17 | 87.7 |
| 48 | 0.44 | 0.24 | 14,000 | 1 | 0–23 | Light-Yellow | do. | 1.37 | 87.5 |

[1]All compositions were 6/4, extended diol/bisphenol-A (based on total diol charge only) (6/4 is weight ratio).
[2]All experiments were performed on 60 gms. of the extended diol and 40 gms. of bisphenol-A. Methylene chloride(1 liter) was the solvent. Pyridine (80 mole % excess over the amount stoichiometrically required) was the catalyst and acid acceptor. The extented diols were prepared by phosgenation of equimolar amounts of Polylactone III and Polyether I.
[3]All RV's in $CHCl_3$ at 25°C (0.2 g/100 ml.).
[4]The reaction mixtures were treated with aqueous hydrochloric acid and then washed with distilled water till neutrality. Polymers were isolated via coagulation in excess methanol.

Examples illustrating the preparation and properties of block copolycarbonates based on the extended diols are tabulated hereinafter in Tables IX thru XIV. The preparation of the block copolycarbonate elastomer is a two-step, one or two pot operation as shown:

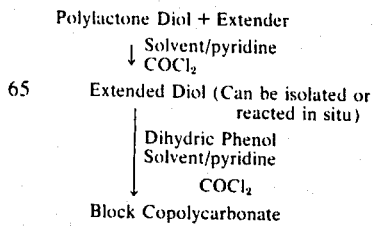

TABLE X

PRIMARY CRYSTALLINITY IN CARBONATE ELASTOMERS BASED ON PREFORMED EXTENDED DIOLS[1]

| Example No. | Extended Diol[4] Mol. Wt | RV[2] of elastomer | $T_2$*(°C) after exposure for hrs. at 100° C | | | | | | | | | Cryst. Time at 100°C(hr.) |
|---|---|---|---|---|---|---|---|---|---|---|---|---|
| | | | 0 | 0.25 | 0.5 | 1 | 3 | 5 | 8 | 13 | 16 | 24 | |
| — | Polylactone II (poly(ε-caprolactone) mol. wt. 2,000)-Polyether I | 1.5 | 90 | — | — | — | — | — | 90 | — | — | 190 | 8–24 |
| 45 | 6,500 | 1.45 | — | — | — | — | 60 | — | 190 | — | 180 | — | 8 |
| 46 | 5,600 | 1.22 | 55 | — | — | — | 75 | 175 | — | — | 180 | — | 5 |
| 48 | 14,000 | 1.37 | 70 | — | — | 70 | 180 | — | — | 190 | — | — | 3 |
| 47 | 14,000 | 1.17 | 70,95 | 190 | — | — | — | — | — | — | — | — | 0.25 |

[1] All compositions were 6/4 (by wt.), soft block/hard block, based on total diol charge only. Compression-molding temperature was 200°C.
[2] RV's on fluff, prior to polymer molding (CHCl₃, 25° C., 0.2 g./100 ml.).
[3] Temperature at which the tensile modulus of the elastomer is 100 p.s.i. This is referred to as the $T_2$ of the product.
[4] The extended diols were prepared by phosgenation of equimolar amounts of Polylactone III and Polyether I.
* See Table A.

TABLE XI

Properties of the Carbonate Elastomers Based on the Performed Extended Diols[1,2]

| Example No. | Mol. Wt. of Extended Diol[1] | Mold Temp. (°C) | RV of elastomer[3] | Annealed[4] (?) | Tensile Mod. (psi) | Tensile Strength (psi) | Elong. (%) | P. Imp. (ft.lbs/in¹) | $T_g$[6] | $T_4$[6] | $T_3$[6] | $T_2$[5] (°C) |
|---|---|---|---|---|---|---|---|---|---|---|---|---|
| 45 | 5,700 | 200 | 1.22 | No | 432 | 3,110 | 605 | — | — | — | — | 55 |
| | | | | Yes | 1,940 | 3,590 | 605 | — | — | — | 45 | 175 |
| 46 | 6,500 | 200 | 1.45 | No | 500 | 3,660 | 550 | — | — | — | — | — |
| | | | | Yes | 1,710 | 3,480 | 665 | — | — | — | 40 | 190 |
| 47 | 14,000 | 200 | 1.17 | No | 530 | 3,670 | 620 | — | — | — | — | 70,95 |
| | | | | Yes | 2,000 | 4,000 | 670 | — | — | — | 160 | 190 |
| 48 | 14,000 | 200 | 1.37 | No | 500 | 4,000 | 580 | — | — | — | — | 70 |
| | | | | Yes | 3,300 | 5,000 | 680 | — | — | — | 50 | 180 |

[1] All extended diols were prepared by phosgenation of equimolar amounts of Polylactone III and Polyether I.
[2] All compositions were 6/4, extended diol/bisphenol-A(based on total diol charge only)6/4 is weight ratio).
[3] RV's on starting fluff, prior to molding. All RV's in CHCl₃, 25°C(0.2 g/100 ml.)
[4] At 100°C. times of annealing were Example 45–5 hours, Example 46–8 hours; Example 46–8 hours; Example 47–15 minutes; Example 48–3 hours.
[5] Temperature at which tensile modulus in 100 psi., referred to often as polymer melting points. See Table A
[6] See Table A

TABLE XII

Carbonate Elastomers Based on Extended Diols[1]

| Example No. | Extended Diols From[2] | Elastomer RV[3] | Yield(%) |
|---|---|---|---|
| 49 | Polylactone II + Bisphenol-A[4] | 1.00–2.40 | 95+ |
| 50 | Polylactone II + Neopentyl Glycol | 1.45 | 89 |
| 51 | Polylactone II + 1,2 Propylene Glycol | 1.40 | 90.7 |
| 52 | Polylactone III + Tetraethylene Glycol | 2.06 | 89.2 |
| 53 | Polylactone II + Ester-Diol I[5] | 1.72 | 86.1 |
| 54 | Polylactone I + Neopentyl Glycol | 1.85(0.87,1.72)[6] | 87.1(88.8,82.7)[6] |
| 55 | Niax Polyol D-520 + 1,2-Propylene Glycol | 1.35 | 87.0 |
| 56 | Niax Polyol D-520 + Tetraethylene Glycol | 2.06 | 81.8 |
| | Polylactone III + Tetraethylene Glycol | 0.96 | 86.7 |

[1] All compositions were 6/4 by wt., extended diol/bisphenol-A based on total diol charge.
[2] The two extended diol components were used in a 1:1 mole ratio. The extended diols were not isolated but used in situ. Experimental procedures were essentially as described in Example 15. Polylactone III, I and II are hydroxyl-terminated poly(ε-caprolactones) of molecular weights about 530, 850 and 2,000, respectively.
[3] All RV's in CHCl₃, at 25°C. (0.2 g./100 ml.).
[4] Several runs were performed. In some the reaction bisphenol-Adichloroformate and Polylactone II (CH₂Cl₂ pyridine) was used to prepare the extended diols. Mole rations dichloroformate/Polylactone II were 3/4 and 7/8 in these two runs.
[5] The formula of Ester-Diol I is: HOCH₂C(CH₃)₂CH₂OCOC(CH₃)₂CH₂OH.

TABLE XIII

Preparations of Carbonate Elastomers[1,2,3]

| Example No. | Extended Diol[4] RV[4,5] | ~Mol. Wt.[4] | Elastomer RV[5] | Yield(%) |
|---|---|---|---|---|
| 57 | 0.28 | 6,200 | 0.65 | — |
| 58 | 0.28 | 6,200 | 0.93 | 85 |
| 59 | 0.28 | 6,200 | 1.19 | 87.02 |
| 60 | 0.28 | 6,200 | 1.80 | 84.9 |
| 61 | 0.33 | 8,100 | 1.04 | 85.9 |
| 62 | 0.33 | 8,100 | 1.27 | 83.8 |
| 63 | 0.33 | 8,100 | 1.64 | 87.8 |
| 64 | 0.49 | 16,100 | 0.82 | — |
| 65 | 0.49 | 16,100 | 0.90 | 84.6 |
| 66 | 0.49 | 16,100 | 1.01 | 85.7 |
| 67 | 0.49 | 16,100 | 1.10 | 85.6 |
| 68 | 0.49 | 16,100 | 1.35 | 83.6 |
| 69 | 0.49 | 16,100 | 1.45 | 86.8 |
| 70 | 0.49 | 16,100 | 1.56 | 87.3 |
| 71 | 0.65 | 45,000 | 1.44 | 85.7 |
| 72 | 0.65 | 45,000 | 1.47 | 82.2 |
| 73 | 0.65 | 45,000 | 1.51 | 84.5 |

[1] Prepared by the 2-step one pot operation.
[2] Preparations were carried out in CH₂Cl₂/pyridine. Weight ratio extended diol/bisphenol-A was 7/3.
[3] All reaction mixtures were acid and water washed till neutrality prior to polymer isolation via coagulation in excess CH₃OH.
[4] The extended diols were prepared by phosgenation of equimolar amounts of Polylactone III and Polyether I.
[5] All RV's in CHCl₃ at 25°C. (0.2 g/100 ml.).

TABLE XIV

Properties of Carbonate Elastomers[1]

| Example No. | RV[2] of Extended Diol | Elastomer RV[4] | Crystallization[3] hrs., 100°C. | Mechanical Properties after 16 hrs. at 100°C | | | | | | Remarks |
|---|---|---|---|---|---|---|---|---|---|---|
| | | | | T.M. (psi) | 100%M (psi) | 300%M (psi) | T.S. (psi) | E (%) | $T_2$ (°C) | |
| 68 | 0.49 | 1.35 | 1 | 2,000 | 520 | 700 | 3,200 | 915 | — | Fast crystallizer. Good Tensile. |
| 69 | 0.49 | 1.45 | 1 | 2,000 | 600 | 800 | 3,300 | 1,000 | — | Fast crystallizer. Good Tensile. |

[1] All elastomers were prepared from the extended diol made by phosgenation of equimolar amounts of Polylactone III and Polyether I Weight ratio extended diol/bisphenol-A was 7/3.
[2] All RV's in CHCl₃ at 25°C (0.2 g/100 ml.). All RV's on fluff, prior to molding.
[3] The term "crystallization" etc. refers to primary crystallization throughout this table. This column gives the exposure times at 100°C. That were required for the development of primary crystallinity in the elastomer.

As shown from the results reported in Table XI – XIV, as the amount by weight of the hard block is increased, the tensile modulus of the block copolymers is increased also.

As indicated earlier, and shown by the data of Tables X and XIV, the use of extended diols in the preparation of block copolymers of this invention permits a reduction in the annealing period. It has been found that alternative procedures may be used for reducing the annealing time.

One of such procedures involves the use of nucleating agents to increase the rate of primary crystallization. For example, crystallization rates of 15 – 30 minutes (at 100°C) have been obtained compared to the large number of hours (e.g., 6 – 24 hours) required for annealing in the absence of nucleating agents. Examples of materials that may be used as nucleating agents are high density polyethylene, polypropylene, lexan, nylon, poly(ethylene terephthalate) microcrystalline cellulose, cabosil, marlex 50 polyethylene, carbon black, fuller's earth, calcium carbonate, glycerine, and butyl benzyl phthalate.

As indicated earlier, the extent of annealing required for imparting the desired high temperature properties of block copolycarbonates having a hard bisphenol A-polycarbonate may be reduced by the use of an extended polylactone diol or by the use of a nucleating agent. Another way of reducing the extent of annealing is to substitute, in part or in full, a dihydric phenol that yields a more readily crystallizable polycarbonate for the bisphenol A that yields a polycarbonate that crystallizes slowly. Examples of such typical dihydric phenols are hydroquinone, 4,4' biphenol, 4,4' dihydroxy diphenyl sulfone, 4,4' dihydroxy diphenyl sulfoxide and 4,4' diphenyl sulfide.

In Tables XV – XIX which follow, there are summarized the preparation and characterization of several hydroquinone and 4,4' biphenol based copolycarbonates. Such block-copolycarbonates were prepared by direct phosgenation of a mixture of hydroquinone or 4,4' biphenol (with or without bisphenol A) and the soft polylactone block. The process was essentially the same general method described hereinbefore with respect to the bisphenol A — polylactone derived block copolycarbonates, the reaction being performed in methylene chloride/pyridine or s-tetrachloroethane/pyridine solvent.

Hydroquinone, 4,4' biphenol and other diphenols give essentially comparable results, i.e., no annealing is required. The advantages of using hydroquinone are also the excellent solvent resistance of the resulting elastomers. In the case of 4,4'' biphenol the solvent resistance is somewhat less good (polymers being soluble to a certain extent in s-tetrachloroethane) but still overall excellent, much better than with bisphenol - A as the hard block component.

TABLE XV

Block Copolycarbonates from Bisphenol-A, Hydroquinone, and Poly(ε-caprolactones)

| Example No. | % Wt.[1] Soft Block[2] | Bis A* | Hydroquinone | Reaction Time (hrs.)[3] | Color Reaction Mixture | Color Coag. Polym. | Polymer[4] RV | Polymer[4] Yield (%) | Remarks |
|---|---|---|---|---|---|---|---|---|---|
| 74 | Polylactone I | 35 | 15 | 1.25 | Light-pink | Practically white | 1.7[5] | 92.6 | Crystallized from solution. |
| 75 | Polylactone I | 20 | 20 | 1.1 | do. do. | do. do. | 0.98[5] | 92.8 | do. |
| 76 | Polylactone II | 35 | 15 | 0.33 | do. do. | Light-yellow | 1.25[5] | 95 | do. |
| 77 | Polylactone II | 30 | 15 | 1.33 | Light-brown | Light-pink | 1.16[5] | 95.3 | do. |
| 78 | Polylactone II | 20 | 20 | 1.33 | do. do. | White | 1.56[5] | 95 | do. |
| 79 | Polylactone II | 25 | 15 | 1.75 | Brown | do. | 0.89[5] | 95.2 | do. |
| 80 | Polylactone II | 30 | 10 | 1.00 | Light-Brown | Light-pink | 1.23[6] | 93.4 | Soluble |
| 81 | Polylactone II | 35 | 5 | 1.1 | do. do. | Light-yellow | 1.39[6] | 94.8 | do. |

[1] The percentages are based on the total diol charge only.
[2] Polylactone I is a poly(α-caprolactone) of mol. wt.~850; Polylactone II is a poly(ε-caprolactone) of mol. wt.~2,000.
[3] The temperature of the reactions was kept within the interval of 0–40°C; all polymerizations were run in CH₂Cl₂/pyridine in the presence of a large excess of base (charge: 100 gms. total diol in 1,000 ml, total solvent; 6/4 by vol. CH₂Cl₂/pyridine)
[4] All polymers were isolated by coagulation of the reaction mixture in excess methanol followed by several methanol and distilled water washes of the solid polymer in the Waring Blendor.
[5] RV's in m-cresol, at 25°C(0.2 g./100 ml.).
[6] RV's in CHCl₃, at 25°C(0.2 g./100 ml.).
*Bisphenol-A

TABLE XVI

Properties of the Block Copolycarbonates from Bisphenol-A, Hydroquinone, and Poly(ε-caprolactones)

| Example No. | Polylactone [1,2] | Percent composition (by wt.) [2] Niax | Bis A | Hydro-quinone | RV [3] | Mold. temp. (°C.) | T.M. (p.s.i.) | 100% mod. (p.s.i.) | 300% mod. (p.s.i.) | T.S. (p.s.i.) | E (percent) | $T_2$ (°C.) | $T_3$ (°C.) | $T_4$ (°C.) | $T_5$ (°C.) |
|---|---|---|---|---|---|---|---|---|---|---|---|---|---|---|---|
| 74 As molded | Polylactone I | 50 | 35 | 15 | 1.70 [5] | 200 | 720 | 560 | 3,600 | 5,200 | 350 | 135 | 25 | 10 | −5 |
| Annealed 16 hrs. at 100° C | | | | | | | 1,500 | 840 | 4,500 | 5,500 | 330 | | | | |
| Air aged 70 days | | | | | | | 1,700 | 1,120 | 4,890 | 4,890 | 300 | | | | |
| 75 As molded | Polylactone I | 60 | 20 | 20 | 0.98 [4] | 200 | 1,850 | 610 | 950 | 950 | 335 | 135 | 80 | | |
| Annealed 16 hrs. at 100° C | | | | | | | 1,100 | 570 | | 750 | 200 | | | | |
| Air aged 70 days | | | | | | | 3,100 | 790 | | 1,100 | 275 | | | | |
| 76 As molded | Polylactone II | 50 | 35 | 15 | 1.25 [4] | 200 | 1,000 | 600 | 3,300 | 8,000 | 410 | 155 | 25 | 10 | −5 |
| Annealed 16 hrs. at 100° C | | | | | | | 1,200 | 890 | 4,100 | 7,800 | 440 | 155 | 40 | | |
| Air aged 70 days | | | | | | | 1,760 | 1,280 | 4,800 | 7,000 | 386 | | | | |
| 77 As molded | Polylactone II | 55 | 30 | 15 | 1.16 [4] | 200 | 1,700 | 420 | 1,100 | 2,200 | 450 | 140 | 75 | | |
| Annealed 16 hrs. at 100° C | | | | | | | 1,550 | 550 | 1,450 | 2,450 | 410 | 140 | 80 | | |
| Air aged 70 days | | | | | | | 2,800 | 775 | 2,100 | 2,600 | 360 | | | | |
| 78 As molded | Polylactone II | 60 | 20 | 20 | 1.56 [4] | 220 | 4,000 | 880 | 2,120 | 4,000 | 500 | 150 | 130 | −10 | −35 |
| Air aged 70 days | | | | | | | 5,725 | 1,075 | 1,700 | 1,600 | 280 | | | | |
| 79 As molded | Polylactone II | 60 | 25 | 15 | 0.89 [3] | 210 | 2,000 | | | 1,500 | 670 | 150 | 105 | | |
| Air aged 70 days | | | | | | | 3,300 | 660 | 1,240 | 2,400 | 525 | | | | |
| 80 As molded | Polylactone II | 60 | 30 | 10 | 1.28 [5] | 220 | 600 | 220 | 260 | 1,250 | 750 | 100 | | | |
| Annealed 16 hrs. at 100° C | | | | | | | 560 | 220 | 285 | 1,200 | 740 | | | | |
| Air aged 70 days | | | | | | | 960 | 335 | 575 | 3,100 | 685 | | | | |
| 81 As molded | Polylactone II | 60 | 35 | 5 | 1.39 [3] | 180 | 440 | 160 | 150 | 800 | 1,050 | 50 | | | |

[1] Polylactone I is a poly(ε-caprolactone) of mol. wt. about 850; Polylactone II is a poly(ε-caprolactone) of mol. wt. about 2,000.
[2] All percentages based on total diol charge only.
[3] RV's on starting polymer fluff, not on compression molded films that were used to obtain the properties.
[4] RV's in m-cresol, at 25° C. (0.2 g./100 ml.).
[5] RV's in CHCl₃ at 25° C. (0.2 g./100 ml.).

TABLE XVII

Block Copolycarbonates from Hydroquinone and Various Soft Blocks

| Example No. | Soft Block % Wt.[1] | % Mole[1] | Hydroquinone % Wt.[1] | % Mole[1] | Reaction Time (Hrs.)[2] | Color React. | Coag. | Polymer[3] RV[4] | Yield(%) | Remarks |
|---|---|---|---|---|---|---|---|---|---|---|
| 82 | Polylactone I[5] 65 | 19.57 | 35 | 80.43 | 0.84 | Yellow | Light-Yellow | 0.20 | 91.2 | Crystallized from reaction solution. |
| 83 | Polylactone I[5] 70 | 23.42 | 30 | 76.58 | 0.84 | do. | do. | 0.46 | 92.9 | Crystallized from reaction solution. |
| 84 | Polylactone I[5] 75 | 28.21 | 25 | 71.79 | 0.5 | Light-Brown | do. | 0.49 | 85.9 | Crystallized from reaction solution. |
| 85 | Polylactone I[5] 80 | 34.57 | 20 | 65.43 | 2.33 | do. | White | 0.90 | 89.6 | Crystallized from reaction solution. |
| 86 | Polylactone I[5] 85 | 42.62 | 15 | 57.38 | 0.9 | Light-Yellow | do. | 1.15 | 88 | Crystallized from reaction solution |
| 87 | Polylactone I[5] 90 | 54.31 | 10 | 45.69 | 0.4 | Light-Brown | Tan | 0.77 | 85.1 | Polymer was soluble in $CHCl_3$ and in the reaction solution. |
| 88 | Polylactone I[5] 95 | 71.51 | 5 | 28.49 | 0.83 | Brown | Light-Pink | 1.22 | 87.9 | Sticky, rubbery polymer; soluble in $CHCl_3$ and in reaction solution. |
| 89 | Polylactone II[5] 80 | 18.42 | 20 | 81.58 | 0.75 | Dark-Pink | do. | 0.77 | 88.4 | Crystallized from reaction solution. |

[1]The percentages are based on the total diol charge only.
[2]The temperature of the reactions was kept within the interval of about 10–35°C. All polymerizations were run in $CH_2Cl_2$/pyridine in the presence of a large excess of base.
[3]All polymers were isolated by coagulation of the reaction solution in excess methanol, followed by several methanol and distilled water washes of the solid polymer in the Waring Blendor.
[4]All RV's in m-cresol, at 25°C (0.2 g/100 ml.).
[5]Polylactone I is a poly($\epsilon$-caprolactone) of mol wt. about 850; Polylactone II is a poly($\epsilon$-caprolactone) of mol wt. about 2,000.

TABLE XVIII

Additional Hydroquinone-Based Carbonate Elastomers

| Example No. | Soft Block, % Wt.[1] | Hydroquinone % Wt.[1] | Reaction Time (hrs.)[2] | Color React. Mixt. | Coag. Polymer[2] | Polymer[2] RV[5] | Yield (%) | Remarks |
|---|---|---|---|---|---|---|---|---|
| 90 | Extended Diol[3] of Example 28 RV[4] = 0.50; 80% | 20 | 2.33[6] | Light Brown | Tan | 1.21 | 81.9 | Crystallized from Solution. |
| 91 | Extended Diol[3] of Example 28 RV[4] = 0.50; 85% | 15 | 1.5[6] | do. | do. | 1.32 | 82.4 | Crystallized from Solution. |
| 92 | Extended Diol[3] of Example 43 RV[4] = 0.28; 80% | 20 | 1.4[7] | Light-Tan | Light-Tan | 0.96 | 93.4 | Crystallized from Solution. |
| 93 | Extended Diol[3] of Example 44 + 20 of Bisphenol-A RV[4] = 0.51; 60% | 20 | 1.1[8] | do. | White | 1.05 | 88.9 | Crystallized from Solution. |

[1]Percentages based on total diol charge only.
[2]Reactions run in the temperature interval of ~0–30°C; polymers were isolated by coagulation of the reaction mixtures in excess methanol, followed by methanol and distilled water washes of the fluff in the Waring Blendor.
[3]Extended diols from Polylactone III (a poly-$\epsilon$-caprolactone of mol. weight ~530) and Polyether I, at a 1:1 mole ratio.
[4]RV's in $CHCl_3$ at 25°C. (0.2 g/100 ml.).
[5]RV's in m-cresol, at 25°C. (0.2 g/100 ml.).
[6]Reactions run in $CH_2Cl_2$/pyridine with a 260% mole excess pyridine.
[7]Reactions run in S-TCE/pyridine with a 260% mole excess pyridine.
[8]Reaction run in $CH_2Cl_2$/pyridine in the presence of a large excess of pyridine.

TABLE XIX

Block Copolycarbonates from Polylactone I[2] and 4,4'-Bisphenol

| Example No. | Polylactone (% Wt.) | 4,4'-Bisphenol, % Wt. | Yield (%) | RV[1] |
|---|---|---|---|---|
| 94 | 60 | 40 | 87.9% | 1.32 |
| 95 | 65 | 35 | 90.8% | 1.70 |
| 96 | 70 | 30 | 91.8% | 1.79 |
| 97 | 80 | 20 | 91.0% | 1.67 |

[1] RV's in m-cresol, at 25°C. (0.2 g/100 ml.).
[2] Polylactone I is a poly-ε-caprolactone of mol wt. 850.

What is claimed is:

1. An extended polylactone diol composition consisting essentially of the reaction product of (1) phosgene, (2) an extending agent having the formula HO—YOH wherein Y is an alkylene group or two or more alkylene groups connected by an ether linkage and (3) a polylactone diol represented by the formula:

$$HO-R'-O-CO-CR_2^2)_gO]_nH$$

wherein R' is a divalent aliphatic hydrocarbon radical or two or more such divalent aliphatic hydrocarbon radicals joined by ether oxygen, $R^2$ is H or monovalent hydrocarbon free of unsaturation and having 1 to 18 carbon atoms, $g$ is an integer of 5 or 6 and $n$ is an integer so that the molecular weight of the polylactone segment, $[CO-CR_2^2)_gO]_n$, is in the range of 500 to 3,000, said extended diol being a liquid at 25°C and containing hydroxy end groups.

2. An extended polylactone diol composition as claimed in claim 1 wherein the extending agent is a polyether diol having a molecular weight up to 2,000.

* * * * *

UNITED STATES PATENT OFFICE
CERTIFICATE OF CORRECTION

Patent No. 3,843,708      Dated October 22, 1974

Inventor(s) M. Matzner

It is certified that error appears in the above-identified patent and that said Letters Patent are hereby corrected as shown below:

Col. 5, line 22, "4,4'-dihydroxyl" should be --4,4'-dihydroxy--.

Col. 7, Table I, under "Temp." in the heading of the seventh column should appear --(°C)--.

Col. 8, Table I, a horizontal line should appear under "Color" and above "Reaction Mixture" and "Coag. Polym.".

Col. 8, Table I, a horizontal line should appear under "Polymer" and above "RV₃" and "Yield".

Col. 9, Table III, in the column headed "Bisphenol", "Dihydroxbenz should be -- Dihydroxybenzo- --.

Col. 9, Table III, after footnote 4 the following should appear --5. This RV was run in CHCl₃, at 25°C. (0.2 g./100 ml.).

Col. 12, line 25, the formula should read

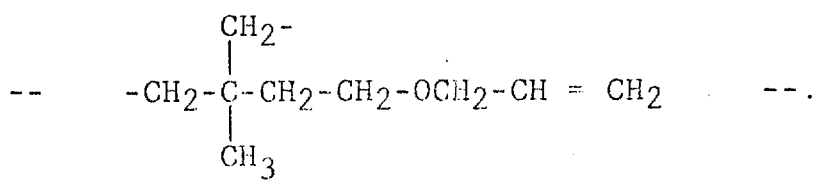

UNITED STATES PATENT OFFICE
CERTIFICATE OF CORRECTION

Patent No. 3,843,708  Dated October 22, 1974

Inventor(s) M. Matzner  Page 2

It is certified that error appears in the above-identified patent and that said Letters Patent are hereby corrected as shown below:

Col. 15, Table V, after footnote (b), the following should appear --(c) Maintained until 82% of phosgene were added.--
--(d) Maintained until 85% of phosgene were added.--

Col. 17, Table VII, in footnote (b), before the parenthesis should appear --,25°C--.

Col. 17, Table VII, in footnote (c), before "-caprolactone" should appear --ε--.

Col. 18, Table VII, below "Yield" in the column heading should appear --(%)--.

Col. 19, Table XII, "Polylactone III" appearing opposite "51" should be --Polylactone II--.

Col. 20, Table XI, under footnote 2, second occurrence an open parenthesis sign -- ( -- should appear before "6/4".

Col. 27, line 20, the formula should read

Signed and Sealed this eighteenth Day of November 1975

[SEAL]

Attest:

RUTH C. MASON  
Attesting Officer

C. MARSHALL DANN  
Commissioner of Patents and Trademarks